United States Patent Office 3,194,995
Patented July 13, 1965

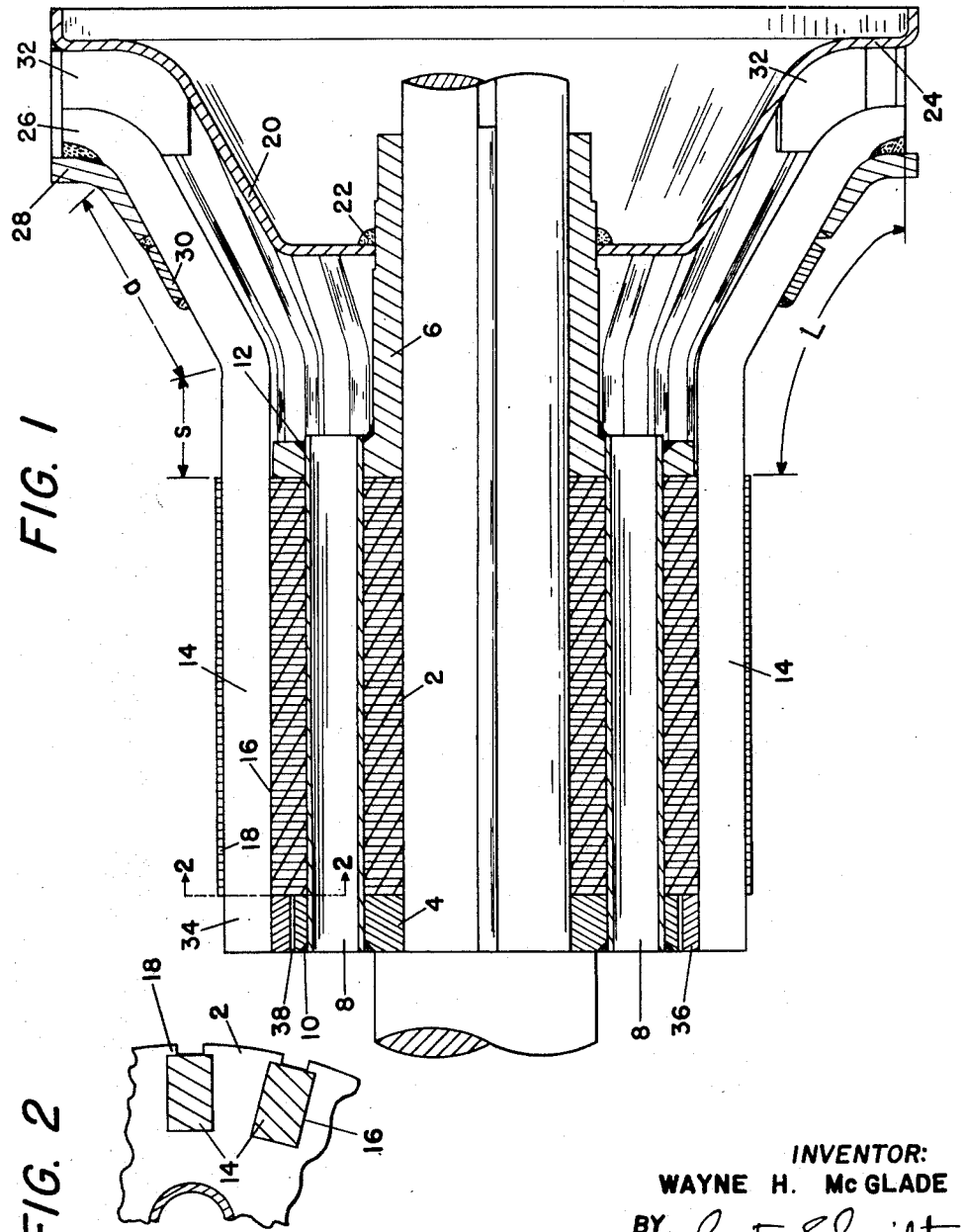

3,194,995
ELECTRIC MOTOR
Wayne H. McGlade, Peoria, Ill., assignor to LeTourneau-Westinghouse Company, Peoria, Ill., a corporation of Illinois
Filed June 27, 1960, Ser. No. 39,129
7 Claims. (Cl. 310—211)

This invention relates to electric motors, and more especially to the rotor structure of induction motors.

As is well known and understood in the art, the rotor of an electric induction motor is made up of a basic steel structure which includes the high permeability core or stack of laminations, and a cage structure which forms the electric circuit and has given rise to the well-known squirrel-cage type of motor. The basic cage structure forming the electric circuit part of the motor is usually of copper or some other excellent conductor of electricity. As is well known by those skilled in the art, the electric circuit portion (copper) has a much higher thermal coefficient of expansion than the basic supporting structure (steel); for this reason, it has been common practice in some such rotor structures to make the electric circuit portion completely free in the axial direction (parallel to the shaft) of the basic supporting structure, permitting the electric circuit portion to expand and contract axially without any fixed orientation in the axial direction relative to the basic supporting structure. In other prior art motors, it has been common practice to restrain the electric circuit structure firmly at both ends relative to the basic supporting structure.

Conventional practice has given rise to substantial difficulties in motor rotors of the type shown in Patents 2,517,002, and 2,531,225 to R. G. LeTourneau, Inc., dated August 1, and November 21, 1950, respectively, and in Patent 3,024,378, assigned to the same assignee as this invention. It is not expedient to make the electric circuit structure of such rotors freely floating relative to the basic supporting structure, and when both ends of the electric circuit structure are restrained, excessive stresses are set up due to the unequal thermal coefficients of expansion, resulting in a high incidence of failure.

It is accordingly an object of this invention to provide an induction motor rotor in which the electric circuit structure includes conductor bars which are supported radially in the high permeability steel throughout only a portion of the length of the bars, necessitating other support means for the portions not thus supported radially; inasmuch as the additional support means restrains the conductor bars axially, it is within the objects of this invention to so mount the conductor bars as to permit free expansion and contraction thereof axially relative to the basic supporting structure from the extremities of the portion not supported by the high permeability section throughout the length of said bars.

In the drawings:

FIG. 1 of the drawing is a longitudinal section through an induction motor rotor made according to this invention, and FIG. 2 is a view in section on line 2—2 of FIG. 1, but on a larger scale.

In the drawings, a high permeability section consisting of a stack of laminations is shown at 2. An end ring 4 at one end of the stack of laminations and a hub 6 at the other end of the stack of laminations are firmly secured together by members 8 passing through suitable openings in the laminations, in the end ring 4, and in the hub 6, being firmly secured at their ends in any suitable manner as by the weldments 10 and 12. The parts numbered 2, 4, and 6, secured together as shown, constitute the basic supporting structure of the motor rotor referred to herein.

Turning now to a description of the electric circuit structure, elongated conductor bars 14 are circumferentially spaced about the periphery of the high permeability section 2. The portion 2 of the rotor is provided with slots 16, and the metal of the laminations overlies the bars at the periphery, as shown at 18, and in this manner supports the bars 14 in the radial direction—i.e., the high permeability portion 2 provides radial support for that portion of each bar which is engaged by the portion 2. See FIG. 2.

The basic supporting structure of the rotor, and more specifically the high permeability section 2, thus constitutes means providing radial support for the bars 14 throughout a portion of their length. However, as is evident from the drawings, each bar has a substantial portion at the right end which is not supported by the high permeability section 2. The length of rotor bar which is thus not supported may be designated by L and is described above as being "substantial." The length of the portion L relative to the whole conductor bar will of course vary with the design of the motor. By "substantial," it is meant that the length L is sufficient to create a stress problem from the standpoint of mechanics. Since the portion L is unsupported by the high permeability core 2, other radial support means must be provided.

The length L of each conductor bar is supported by means providing axial and radial support, these means moreover constituting the sole axial support of the bars. More specifically, an end bell 20 is secured to the basic supporting structure by being welded to the hub 6 at 22. End bell 20 is provided with a radial flange 24. Conductor bars 14 extend in a straight line to the right as seen in the drawing for a distance s from the end of the radial support means 2. The bars are then bent so as to extend radially and axially outward for another length a, and the extremities 26 are flanged radially outward. A resistance ring 28 is welded to the extremities 26 and constitutes means electrically connecting the conductor bars 14 adjacent their extremities 26. In some motor designs, the combination of the length L and the top rotating speed will be such as to warrant additional restraints against centrifugal forces, and in such cases, a torque ring 30 may be provided.

It will be apparent from the foregoing that the electric circuit structure is a squirrel-cage type having a cylindrical portion and a conical portion. The cylindrical portion comprises the parts of the bars in the slots 16 plus the bar lengths s; the conical portion is made up of the bar lengths a.

The electrical connecting means or resistance ring 28 and the bar extremities 26 are spaced from the support member 20 by means of struts 32 welded to the two pieces 20 and 28. Struts 32 serve as fan blades to pump air through the hollow members 8 and between the spaced rings 28 and 20. This structure is described in detail and is claimed in Patent 3,024,378, referred to above, and reference may be had thereto for a fuller understanding of the cooling action.

The ends 34 of the bars 14 opposite the extremities 26 are electrically connected by a conductor ring 36. Ring 36 is electrically and mechanically secured to each of the bar ends 34, as for example by welding. It should be noted that the conductor ring 36 is entirely independent of the basic rotor supporting structure; note especially the air gap 38. The only point at which the conductor bars 14 are axially restrained is applied to such a short length of bar as to create no problem from the standpoint of thermal expansion stresses. The entire length of each bar to the left of torque ring 30 is free to expand and contract axially because the bars 14 are free to move axially in their slots 16, and connecting ring 36 is mechanically independent of end ring 4.

Operation

As is pointed out in the above-identified copending application, electric motors of the type for which the subject rotors are designed work in applications requiring a great many reversals at very high torque. These motors are subjected to tremendous starting and stopping torques, going from 0 to 3,500 r.p.m. in about .5 second and stopping in a similar short time. Furthermore, in many applications, these motors are thus reversed in rapid succession with little or no time between reverse cycles for cooling. Consequently, the entire rotor structure is subjected to very high operating temperatures. If the conductor bars are secured throughout their length or at both ends against axial displacement as is the practice in conventional rotors, the electric circuit portion of the rotor would be attempting to expand axially at approximately twice the rate of the basic supporting structure, with the result that very high thermal stresses would be generated. In a rotor made according to this invention, the conductor bars are secured axially at one end and are free to expand and contract axially independently of the basic supporting structure throughout the remainder of their length.

It will be apparent from the foregoing that this invention provides a rotor structure which allows the electrical structure to expand and contract independently of the basic supporting structure, thus greatly reducing motor failure and correspondingly increasing availability and reliability of the equipment. Other advantages will be apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. In an electric motor rotor, circumferentially spaced elongated conductor bars, means providing radial support only for the bars throughout a portion of their length while permitting free axial movement of the bars relative to the radial support means, each bar having a substantial portion at one end unsupported by said means and having the extremity of said one end bent radially outward, means electrically connecting said extremities of the bars, other radial support means spaced from said electrical connecting means and from said bar extremities, strut members secured to the electrical connecting means and said other radial support means, means electrically connecting the opposite ends of the bars and movable axially relative to the first-named means, and means fixing said other radial support means axially relative to the first-named radial support means, whereby the bars are free to expand and contract axially from their said extremities throughout their length.

2. In an electric motor rotor, circumferentially spaced elongated conductor bars, means providing radial support for the bars throughout a portion of their length while permitting free axial movement of the bars relative to the radial support means, each bar having a substantial portion at one end unsupported by said means, means electrically connecting the extremity of each said one end of the bars, other radial support means axially remote from the first-named radial support means, means secured to the electrical connecting means and said other radial support means and spacing them apart axially, means electrically connecting the opposite ends of the bars and movable axially relative to the first-named means, and means fixing said other radial support means axially relative to the first-named radial support means, whereby the bars are free to expand and contract axially relative to the first-named radial support means from their said extremities throughout their length.

3. In an electric motor rotor, circumferentially spaced elongated conductor bars, each bar having a first portion which is axially straight and a second portion which extends radially and axially outward from the first portion, means providing radial support only throughout less than all of the first portion of each bar, each bar having a first extremity adjacent the radial support providing means and a second extremity adjacent the outer-most end of said second portion, means electrically connecting the first extremities of the bars and mechanically independent of the radial support providing means, second radial support means axially remote from said radial support providing means, means axially and radially securing the second extremities of the bars to the second radial support means, and means securing the second radial support means against axial movement relative to said radial support providing means, whereby the bars are free to expand and contract relative to said radial support providing means.

4. In an electric motor rotor, circumferentially spaced elongated conductor bars, each bar having a first portion which is axially straight and a second portion which extends radially and axially outward from the first portion, means providing radial support only throughout less than all of the first portion of each bar whereby the second portion and the adjacent part of the first portion of each bar are unsupported by said radial support providing means, each bar having a first extremity adjacent the radial support providing means and a second extremity adjacent the outermost end of said second portion, means electrically connecting the first extremities of the bars and mechanically independent of the radial support providing means, second radial support means axially remote from said radial support providing means, means axially and radially securing the second extremities of the bars to the second radial support means, and means securing the second radial support means against axial movement relative to said radial support providing means, whereby the bars are free to expand and contract relative to said radial support providing means.

5. In an electric motor rotor: a squirrel-cage electric circuit structure having conductor bars forming a cylindrical portion and a conical portion, and conical means electrically connecting the conical portion of the bars; means providing radial support only for less than all of the cylindrical portion, whereby the conical portion and the adjacent cylindrical portion are thus unsupported; means electrically connecting the outer extremities of the cylindrical portion of the conductor bars and mechanically independent of said radial support providing means; conical support means; means to secure the conical support means to the first-named electrical connecting means in spaced relationship to provide a conical fluid conduit; and means fixing the conical support means axially relative to said radial support providing means whereby the squirrel cage is restrained axially only by the conical support means.

6. In an electric motor rotor: a squirrel-cage electric circuit structure having conductor bars forming a cylindrical portion and a conical portion, and conical means electrically connecting the conical portion of the bars; means providing radial support only for less than all of the cylindrical portion, whereby the conical portion and the adjacent cylindrical portion are thus unsupported; means electrically connecting the outer extremities of the cylindrical portion of the conductor bars and mechanically independent of said radial support providing means; conical support means; fan blade members securing the conical support means to the first-named electrical connecting means in spaced relationship to provide a conical fluid conduit; and means fixing the conical support means axially relative to said radial support providing means whereby the squirrel cage is restrained axially only by the conical support means.

7. An induction motor rotor comprising: a basic supporting structure including a slotted stack of laminations, a first end ring at one end of the stack, a second end ring at the other end of the stack, and means securing the end rings together and clamping said stack between the end rings; an electric circuit structure including a conductor bar lying in each of the slots of said slotted stack, each such bar having an extremity overlying said first end ring and a substantial length overlying and extending beyond said second end ring, a conductor ring electrically connecting said extremities of the bars, the conductor ring being coaxial and coplanar with said first end ring and structurally independent thereof, and another conductor ring electrically connecting said substantial lengths of the bars; the laminations having portions overlying the bars to restrain the bars radially; support means secured to the basic supporting structure and spaced from said stack; and fan blades securing said other conductor ring to the support means.

References Cited by the Examiner

UNITED STATES PATENTS

| | | | |
|---|---|---|---|
| 872,708 | 12/07 | Behrend | 310—211 |
| 920,798 | 5/09 | Wiard | 310—211 |
| 2,462,516 | 2/49 | LeTourneau | 310—211 |
| 2,517,002 | 8/50 | LeTourneau | 310—211 |
| 2,519,219 | 8/50 | Baudry et al. | 310—270 |
| 2,531,225 | 11/50 | LeTourneau | 310—211 |

ORIS L. RADER, *Primary Examiner.*

MILTON O. HIRSCHFIELD, DAVID X. SLINEY,
*Examiners.*